United States Patent [19]

Tahira

[11] Patent Number: 5,506,726
[45] Date of Patent: Apr. 9, 1996

US005506726A

[54] BINOCULARS AND CAMERA WITH BINOCULARS

[76] Inventor: Tadao Tahira, Nihon Syscom Co., Ltd. 38-13 Higashi-Ikou-cho, Adachi-ku, Tokyo, Japan

[21] Appl. No.: 280,900

[22] Filed: Jul. 27, 1994

[30] Foreign Application Priority Data

Aug. 2, 1993 [JP] Japan ................... 5-049700 U
Aug. 18, 1993 [JP] Japan ................... 5-051479 U

[51] Int. Cl.$^6$ ................... G02B 27/02; G02B 23/00
[52] U.S. Cl. ................... 359/480; 359/407; 359/408; 359/415
[58] Field of Search ................... 359/399, 404, 359/406–410, 480–481, 817; 354/295, 76, 187

[56] References Cited

U.S. PATENT DOCUMENTS

| 2,882,791 | 4/1959 | Möller et al. | 359/415 |
| 4,239,328 | 12/1980 | Justice, Sr. et al. | 359/408 |
| 4,443,071 | 4/1984 | Ueda | 359/408 |
| 4,445,766 | 5/1984 | Yamazaki | 359/407 |

*Primary Examiner*—Thong Q. Nguyen
*Attorney, Agent, or Firm*—Jordan and Hamburg

[57] ABSTRACT

Binoculars, having a body made of a cardboard or cardboard-like synthetic resin material, are convertible into a box-like form wherein a pair of objective lenses and a pair of eyepiece lenses are correspondingly positioned for use, and are foldable into a panel-like form along folds thereof when not in use and stored. The binoculars are optionally attachable to a disposable camera and may be place in a folded state while allowing use of the disposable camera.

7 Claims, 14 Drawing Sheets

BINOCULARS AND CAMERA WITH BINOCULARS

BACKGROUND OF THE INVENTION

The present invention relates to binoculars, for use in watching sports, drama or similar events, and to a disposable camera with binoculars.

Conventional binoculars comprising a pair of tube-like frames, and opera-glass binoculars which can be folded when put away, have been used in watching sports and drama.

The above-mentioned binoculars, however, are inconvenient to carry due to the tube-like frame. The above-mentioned opera glasses have a drawback in that it costs much to produce from materials such as metallic board and rigid board made of synthetic resin, additionally, it is inconvenient to carry the opera glasses around without a bag though they can be folded into a small-sized form. On the other hand, the number of people who indispensably use binoculars and a camera in watching sports and drama is increasing.

SUMMARY OF THE INVENTION

In view of the above-mentioned drawbacks, it is an object of this invention to provide binoculars which can be folded and produced at a small cost from a material such as a cardboard or a cardboard-like synthetic resin material, and which are attachable to a disposable camera with adhesive bonding.

It is a further object of this invention to provide a camera with binoculars, which are used conveniently and which are foldable and combined with a disposable camera.

In accordance with the invention, there are provided binoculars comprising an objective lens panel on which a pair of objective lenses are mounted, top and bottom panels, each of which is joined to the objective lens panel by front folding portions at top and bottom edges of said objective lens panel such that each of the top and bottom panels extend in the depthwise direction, the top and bottom panels each having a fold in a middle of the depth thereof allowing outward deflection, an eyepiece lens panel joined to said top and bottom panels rear folding portions at rear edges of the top and bottom panels, the eyepiece lens panel having a pair of eyepiece lenses associated with the pair of objective lenses mounted thereon, and side panels for closing right and left sides of the binoculars, each side panel being joined to the objective lens panel and the eyepiece lens panel through front side folding portions at lengthwise ends of the objective lens panel and rear side folding portions at lengthwise ends of the eyepiece lens panel allowing the side panels to be folded inwardly at a middle depth thereof to permit use of the binoculars by expansion into a box-like form.

According to a feature of the invention, the binoculars are foldable into a card-like form with the top and bottom panels and the right and left side panels folded when not in use. Accordingly, the binoculars are folded into a small and compact form for easy transport.

Since the objective lens panel, the top and bottom panels, the eyepiece lens panel and the right and left side panels are formed from cardboard or similar material, construction is simple and production costs are small.

Furthermore, since the binoculars are attachable to a disposable camera, efficient use and transport for watching sports and drama is possible.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
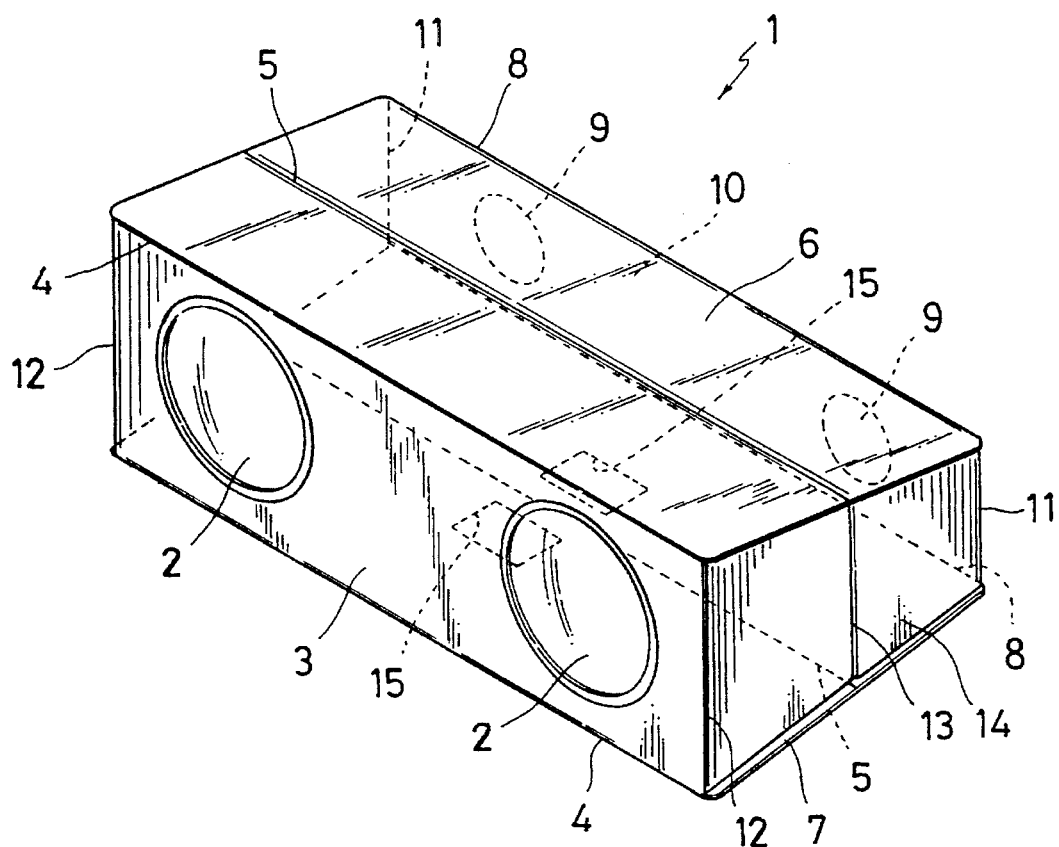
FIG. 1 is a perspective view showing a first embodiment of the present invention.
Figure 2:
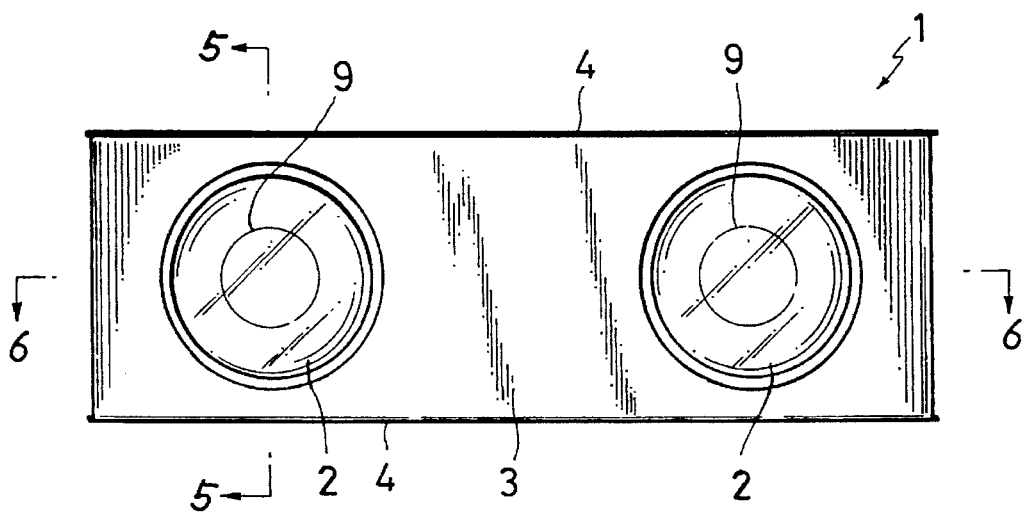
FIG. 2 is a front view of the first embodiment.
Figure 3:
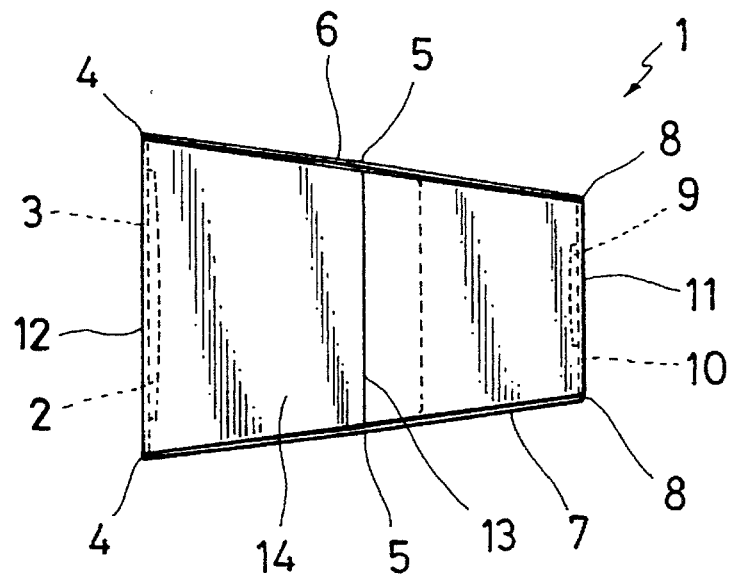
FIG. 3 is a side view of the first embodiment.
Figure 4:
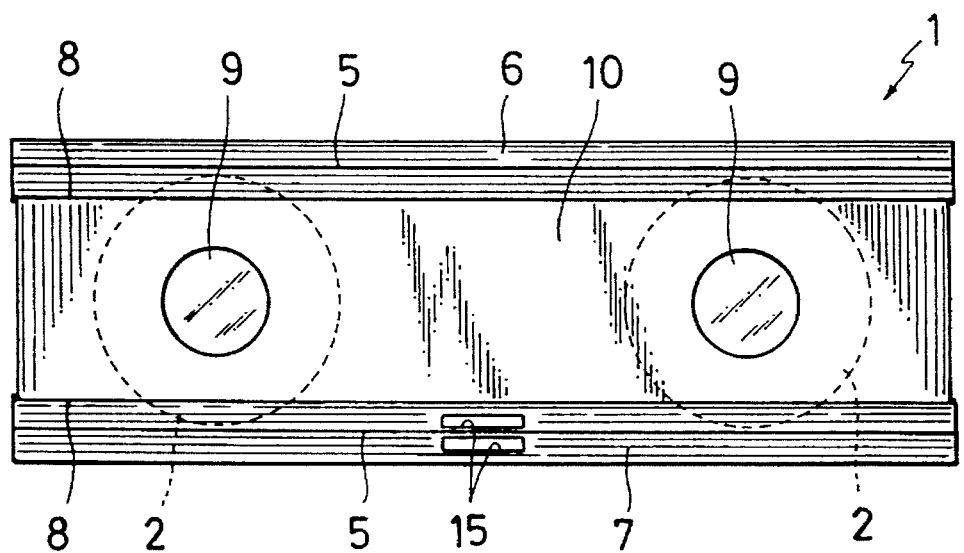
FIG. 4 is a rear view of the first embodiment.
Figure 5:
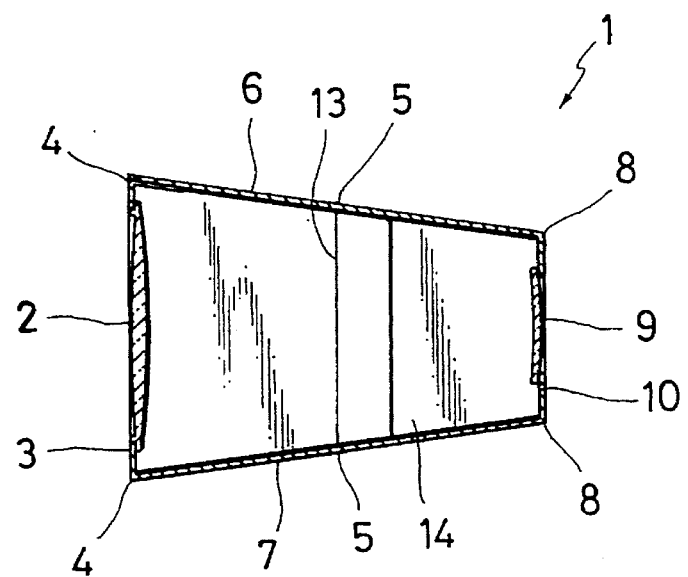
FIG. 5 is a cross-sectional view taken along the line 5—5 of FIG. 2.
Figure 6:
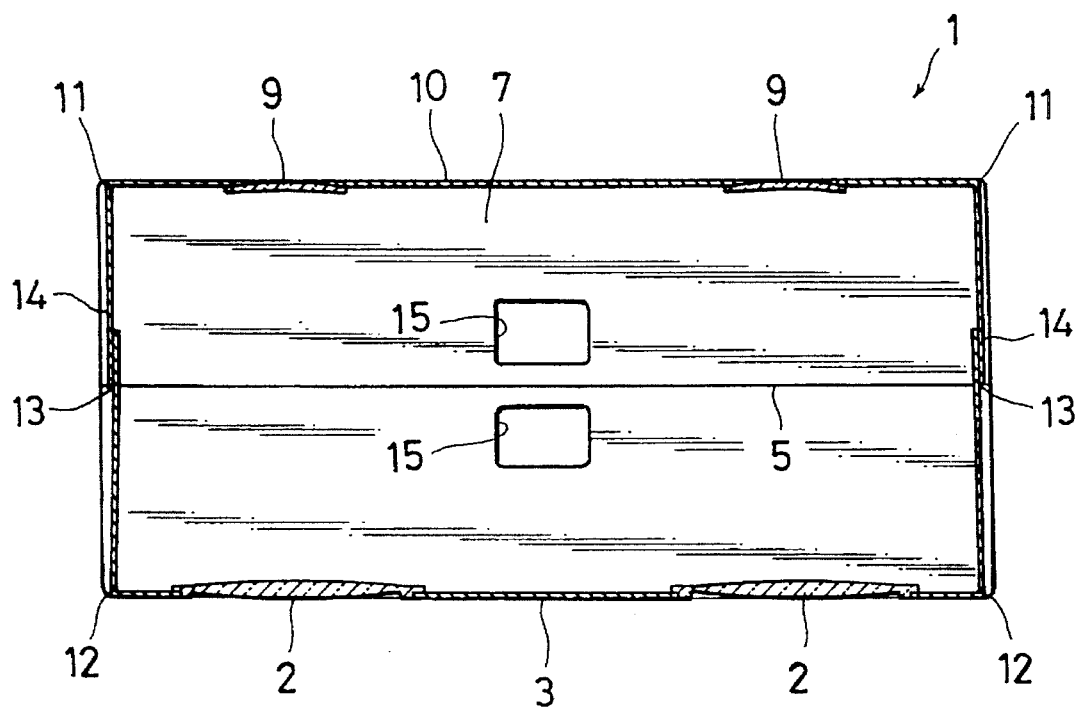
FIG. 6 is a cross-sectional view taken along the line 6—6 of FIG. 2.

Referring to a first embodiment of the present invention shown in FIGS. 1 to 13 inclusive, binoculars 1 have a trapezoidal-box-like form when expanded for use and are foldable into a panel-like form when not in use. An objective lens panel 3 is made of a cardboard, or a cardboard coated with a sheet of synthetic resin material, and has a pair of objective lenses 2, 2 made from plastic mounted thereon. Top and bottom panels 6, 7 are joined integrally to the objective lens-mounted panel 3 through front folding portions 4, 4 at widthwise ends of the objective lens-mounted panel 3 and extend in a backward direction. The top and bottom panels are foldable outwardly along center folding portions 5, 5 provided in the middle thereof. An eyepiece lens panel 10 is joined integrally to the top and bottom panels 6, 7 through rear folding portions 8, 8 at rear depthwise ends of the top and bottom panels 6, 7. The eyepiece lens panel 10 has a pair of eyepiece lenses 9, 9, made from plastic, which optically cooperate with the pair of objective lenses 2, 2. Side panels 14, 14 in right and left sides of the binoculars 1 are joined to the objective lens panel 3 through front side folding portions 12, 12 at lengthwise ends of the objective lens panel 3 and to the eyepiece lens panel 10 through rear side folding portions 11, 11 at the lengthwise ends of the eyepiece lens panel 10. The side panels 14, 14 are foldable inwardly along side folding portions 13, 13 in the middle thereof. Two windows 15, 15 are provided at a point near to a center of the center folding portion 5 of the bottom panel 7 and are positioned to coincide with each other when the bottom panel 7 is folded outwardly along the center folding portion 5 as shown in FIG. 7.

Figure 7:
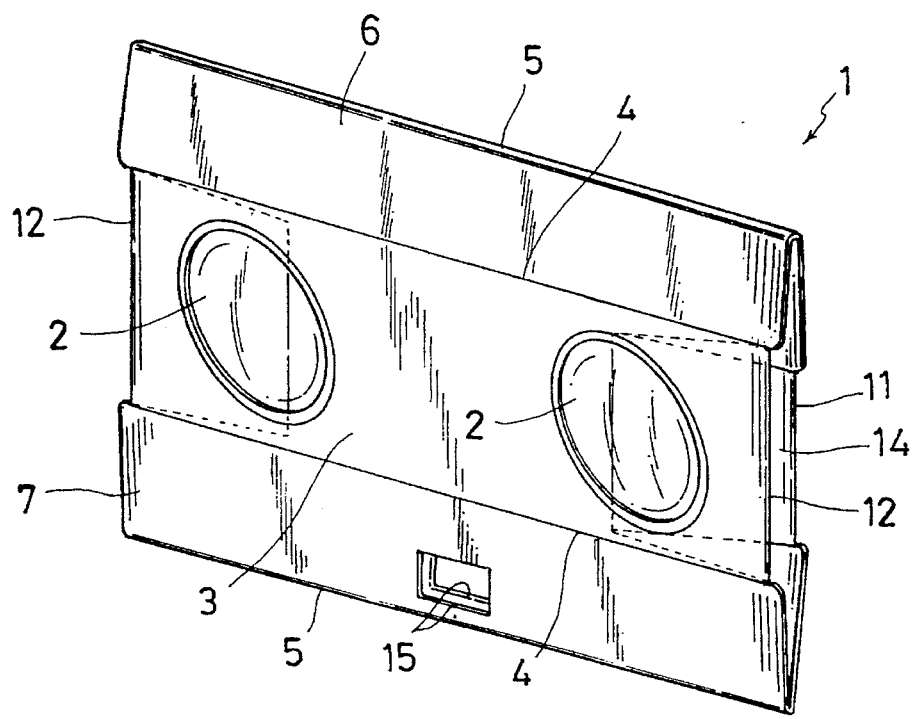
FIG. 7 is an explanatory view of the first embodiment in a folded state.
Figure 8:
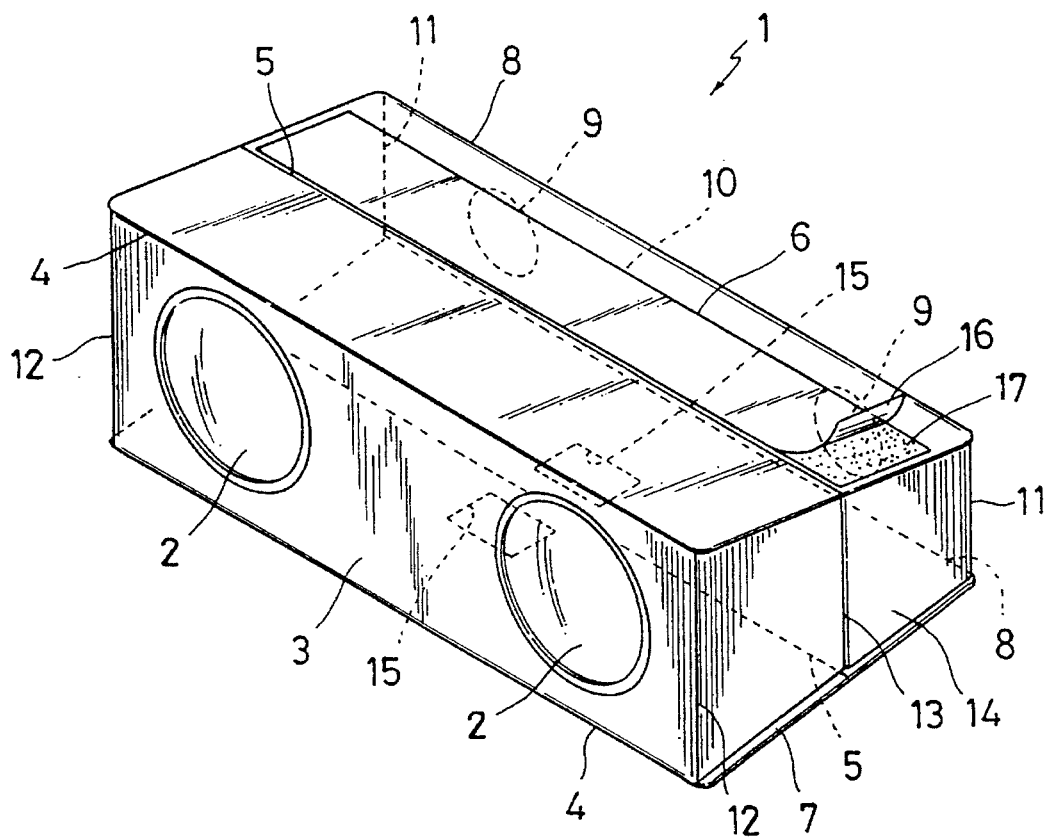
FIG. 8 is an explanatory view of the first embodiment shown with double-sided-adhesive tape bonded thereto.

With the binoculars 1 in the collapsed state of FIG. 7, when the center folding portions 5, 5 on the top and bottom panels 6, 7 are pushed down, the top and bottom panels 6, 7 take on a flat board-like form and the side panels 14, 14 in the fight and left sides thereof extend to cover both side openings, resulting in the binoculars 1 assuming a trapezoidal box-like form, as shown in FIGS. 1 to 6 inclusive.

In the box-like form, the binoculars 1 are used in the same way as conventional ones; a user has a magnified view through the pair of eyepiece lenses 9, 9.

An optimum focal length is set by adjusting the length between the eyepiece lenses 9, 9 and the objective lenses 2, 2 by variably compressing the center folding portions 5, 5 against an elasticity thereof, on the top and bottom panels 6, 7.

To collapse the binoculars 1 into a folded form, the objective lens panel 3 and the eyepiece lens panel 10 are pushed together, causing the top and bottom panels 6, 7 to fold outwardly along the center folding portions 5, 5 and side panels 14, 14 to fold inwardly along each side folding portion 13, 13 into the collapsed form shown in FIG. 7.

Figure 9:
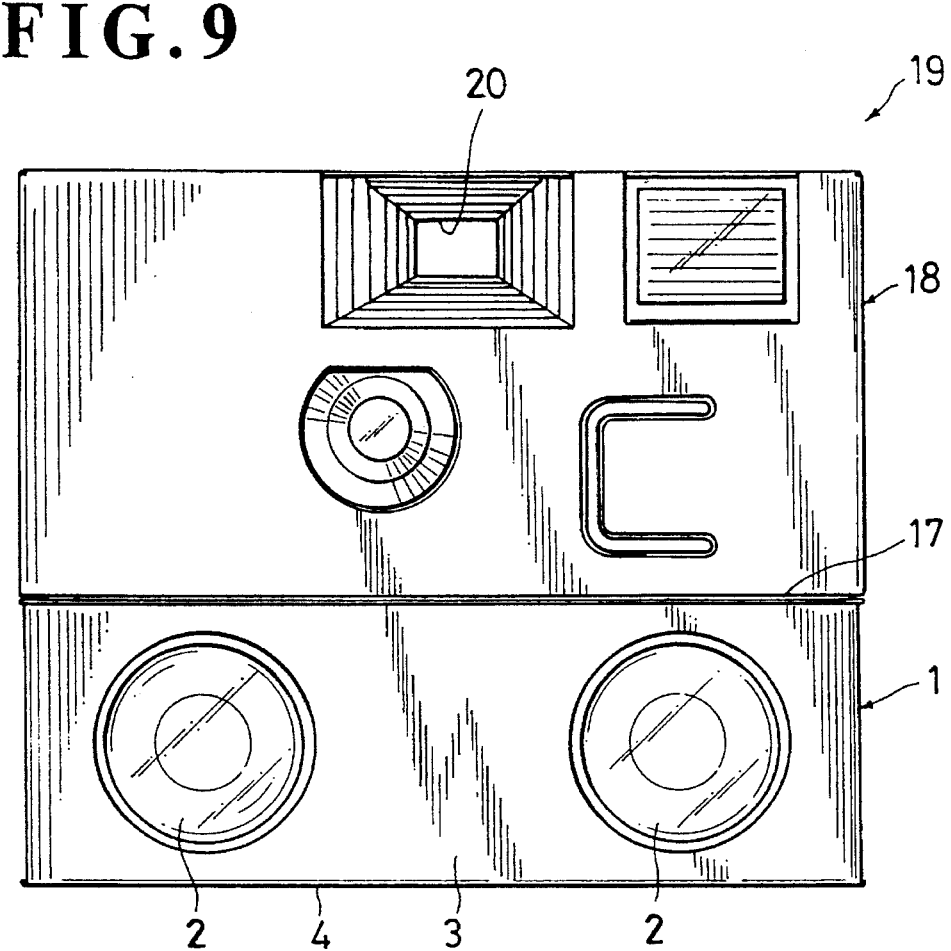
FIG. 9 is an elevational view of the first embodiment shown attached to a disposable camera.
Figure 10:
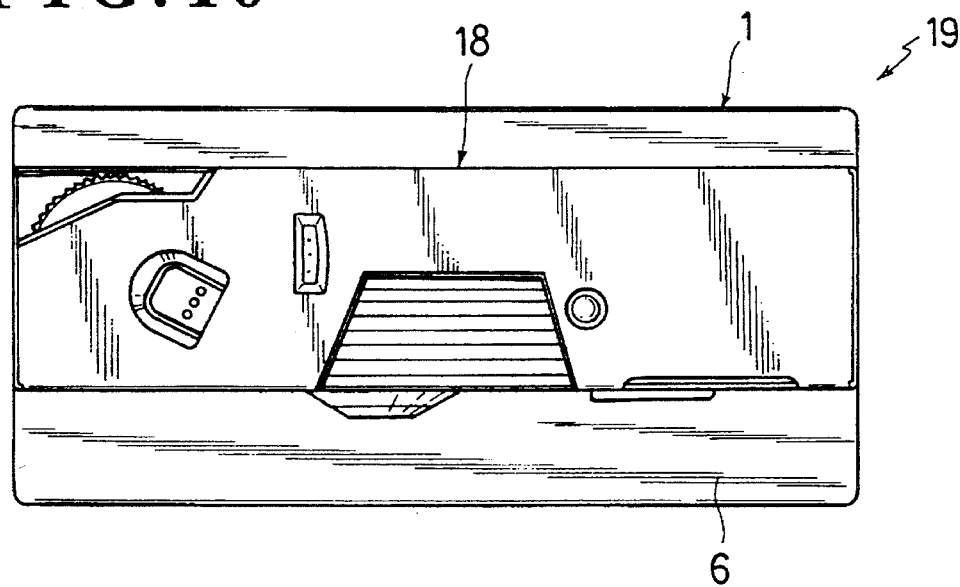
FIG. 10 is a plan view of the first embodiment shown attached to a disposable camera.
Figure 11:
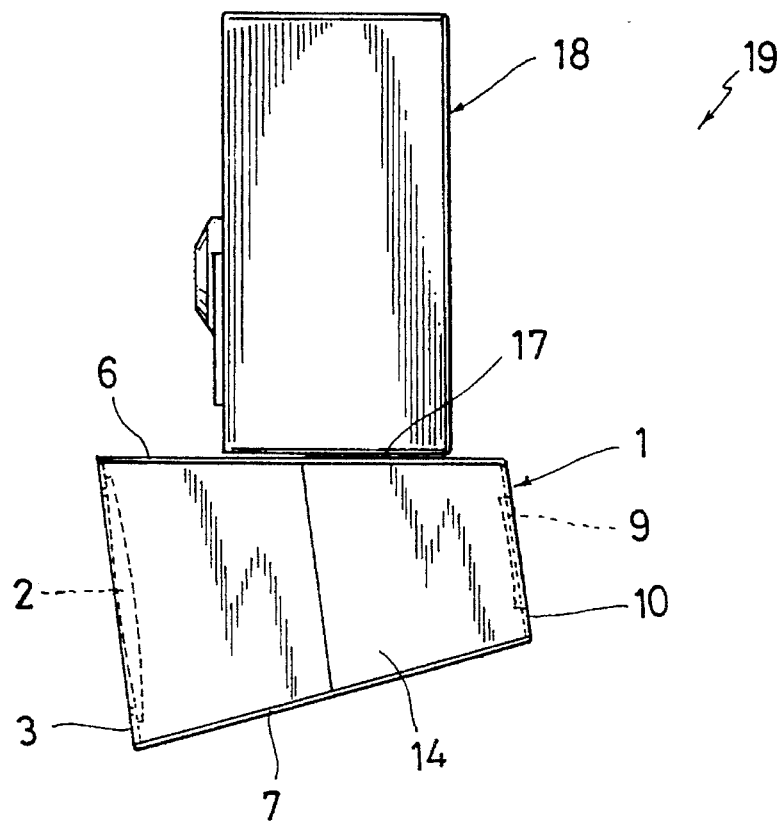
FIG. 11 is a side view of the first embodiment shown attached to a disposable camera.
Figure 12:
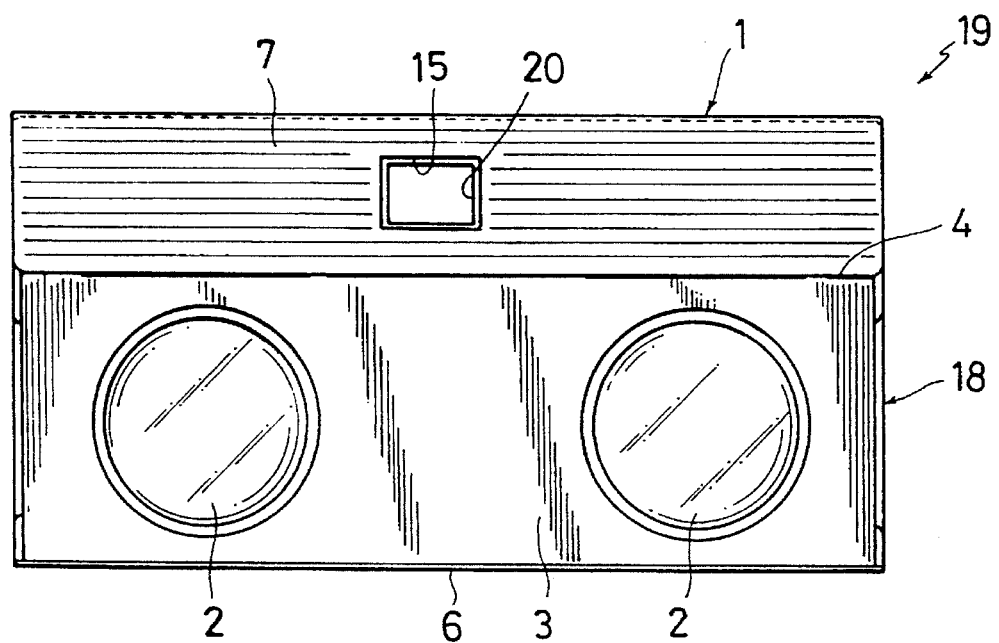
FIG. 12 is a rear view showing the first embodiment folded while the disposable camera is used.
Figure 13:
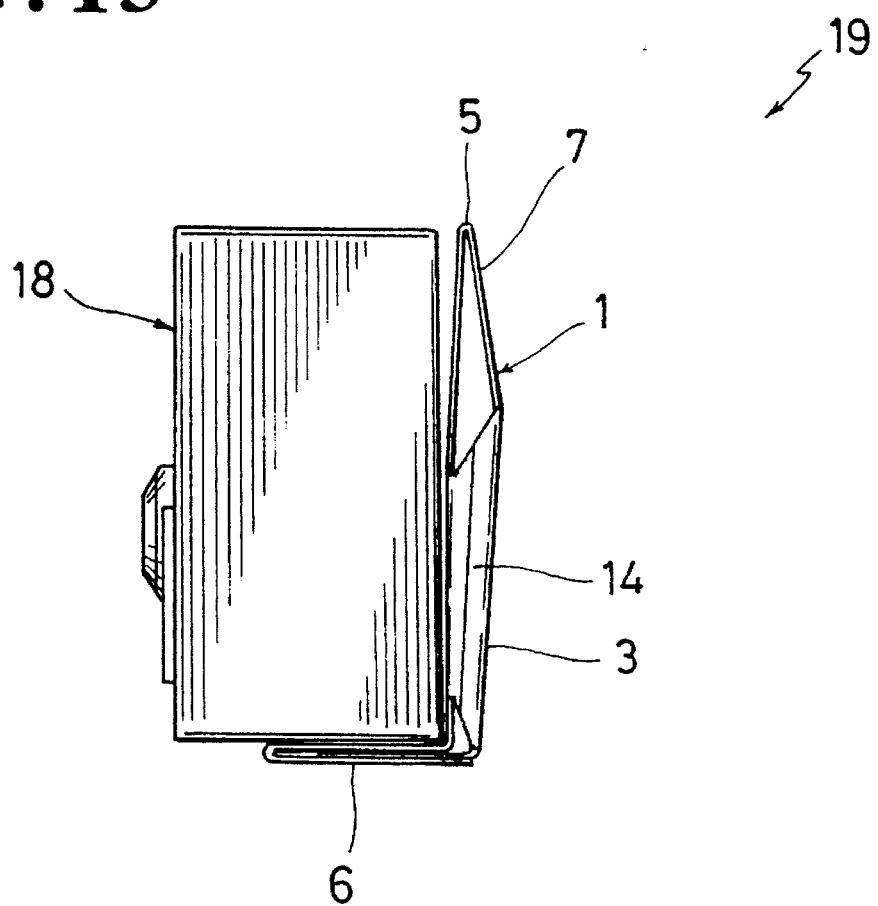
FIG. 13 is a side view showing the first embodiment folded while the disposable camera is used.
Figure 14:
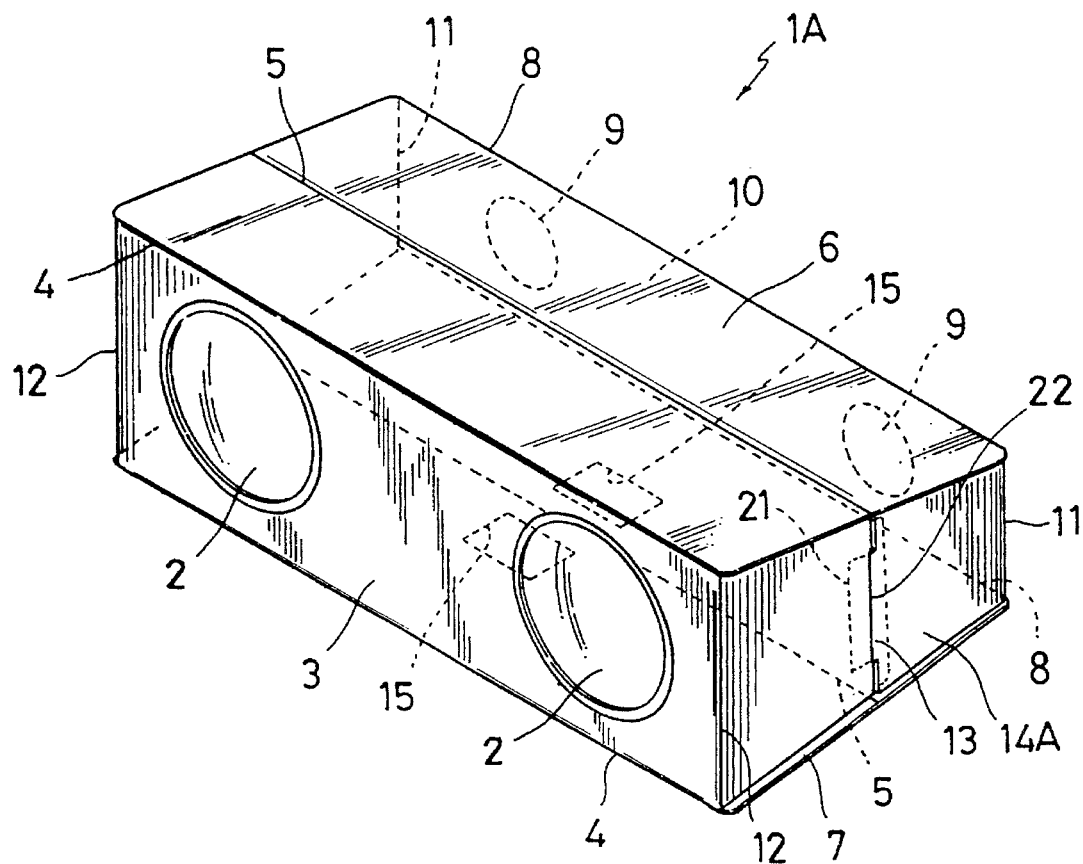
FIG. 14 is a perspective view of the second embodiment of the present invention.
Figure 15:
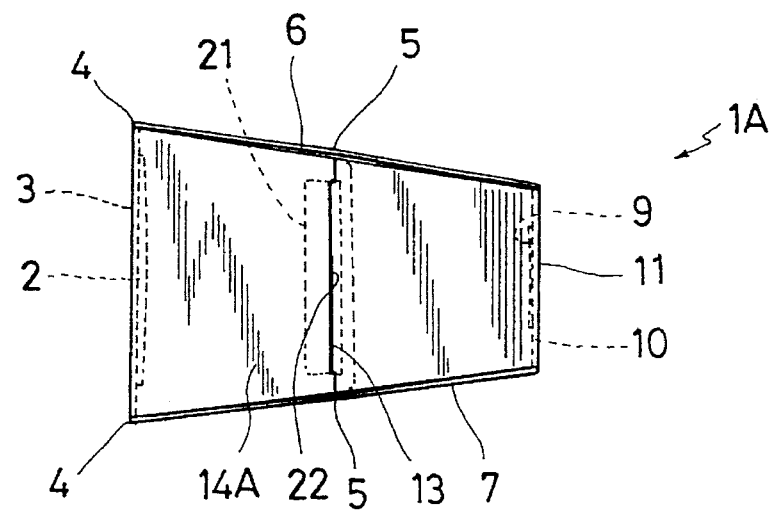
FIG. 15 is a side view of the second embodiment.
Figure 16:
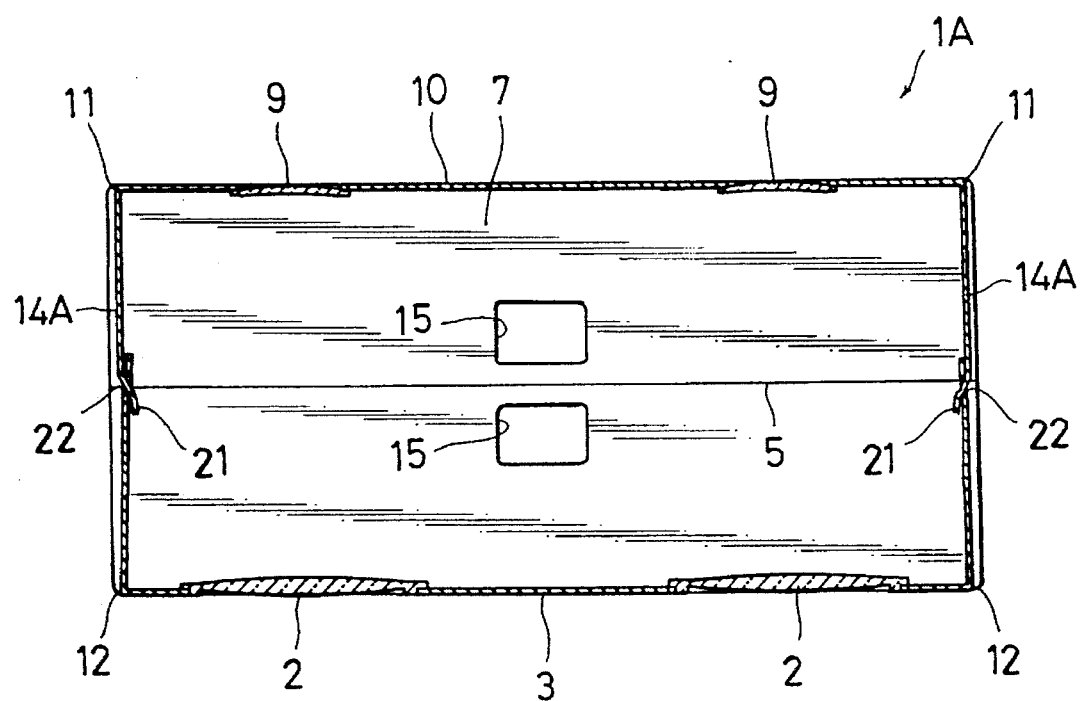
FIG. 16 is a cross-sectional view of the second embodiment.
Figure 17:
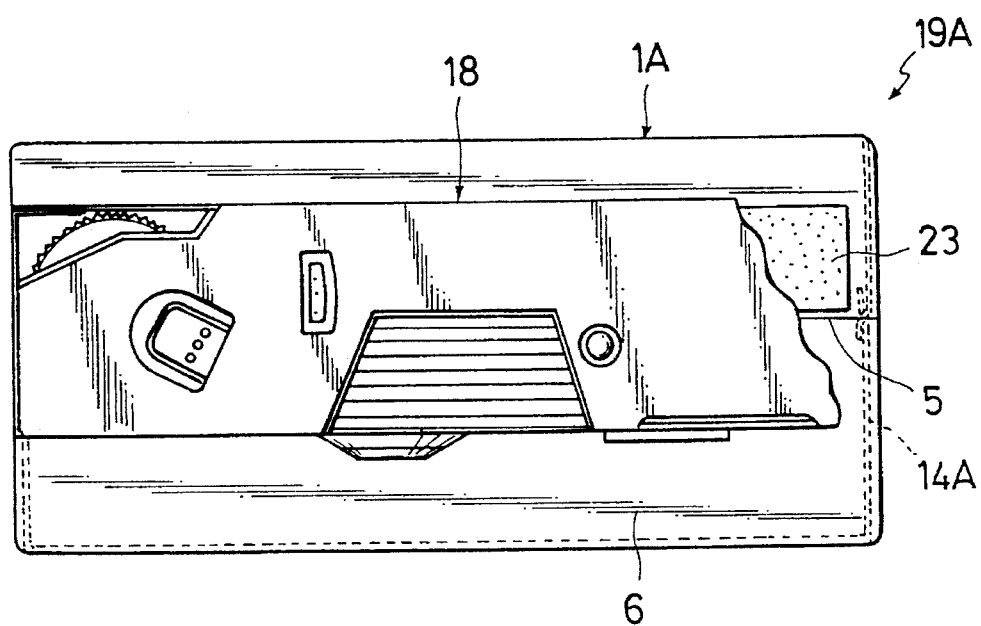
FIG. 17 is a plan view of the second embodiment shown attached to a disposable camera.
Figure 18:
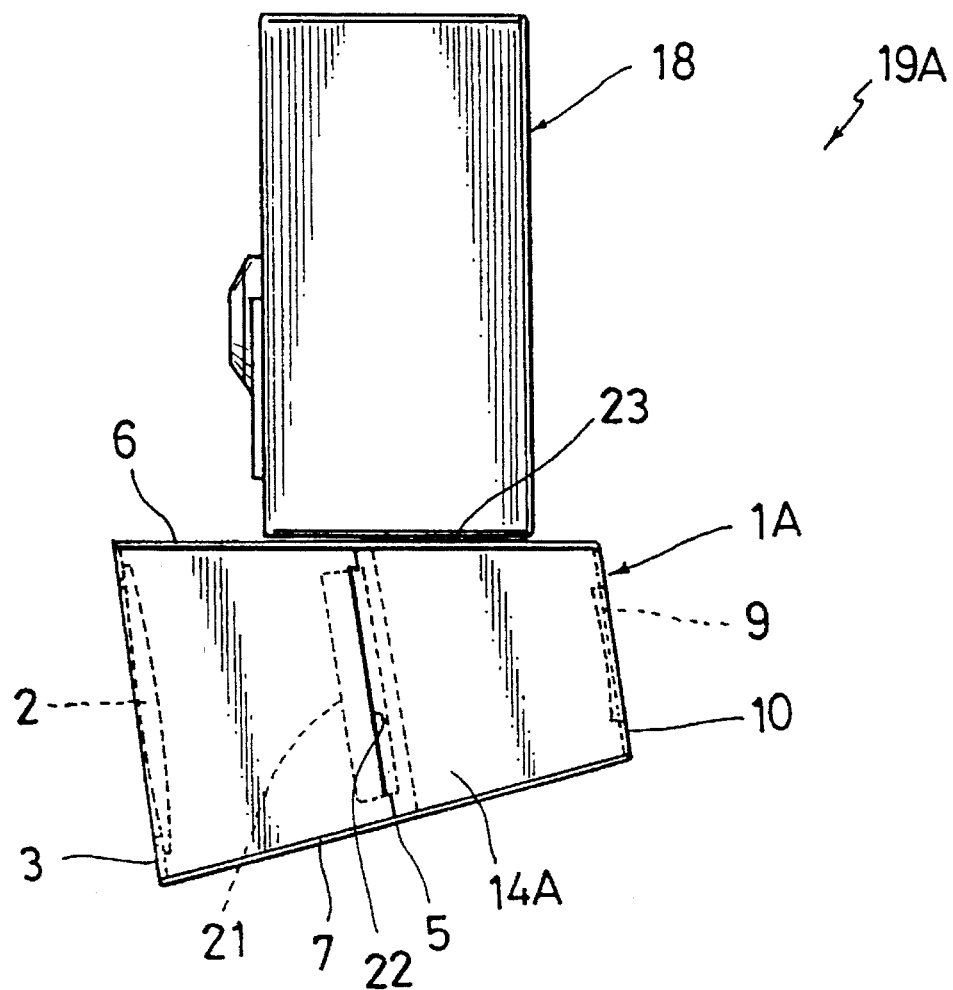
FIG. 18 is a side view of the second embodiment shown attached to a disposable camera.
Figure 19:
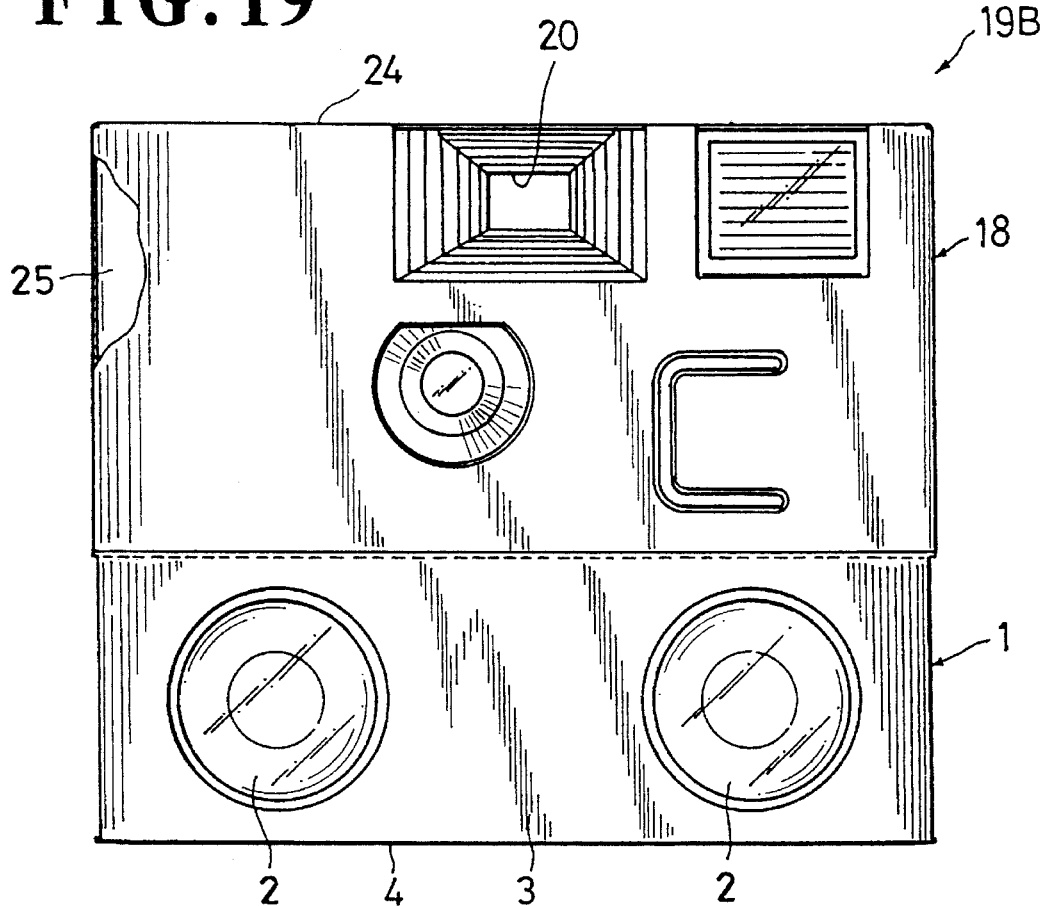
FIG. 19 is an elevational view of the third embodiment of present invention.
Figure 20:
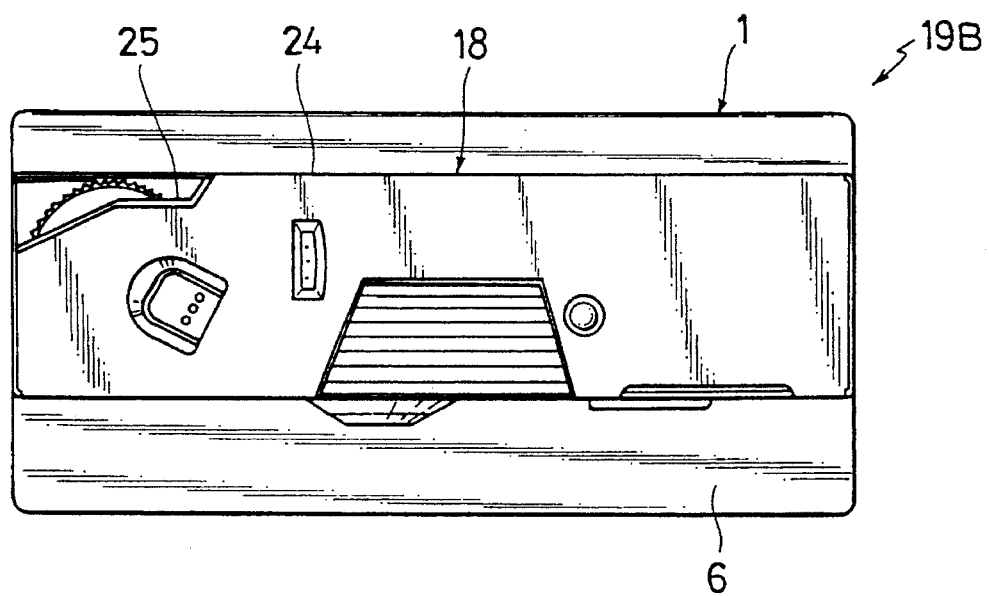
FIG. 20 is a plan view of the third embodiment.
Figure 21:
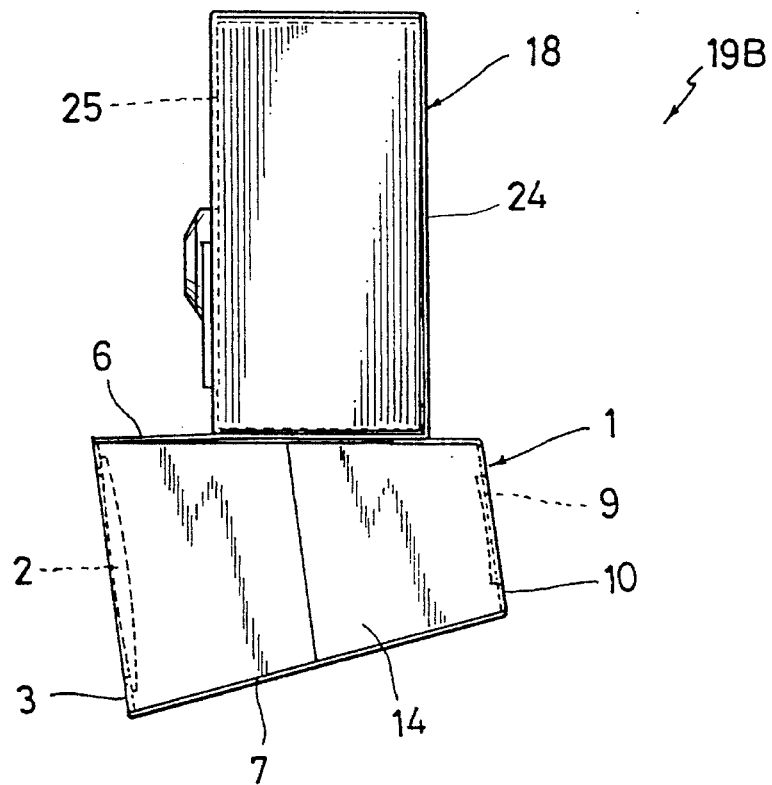
FIG. 21 is a side view of the third embodiment.
Figure 22:
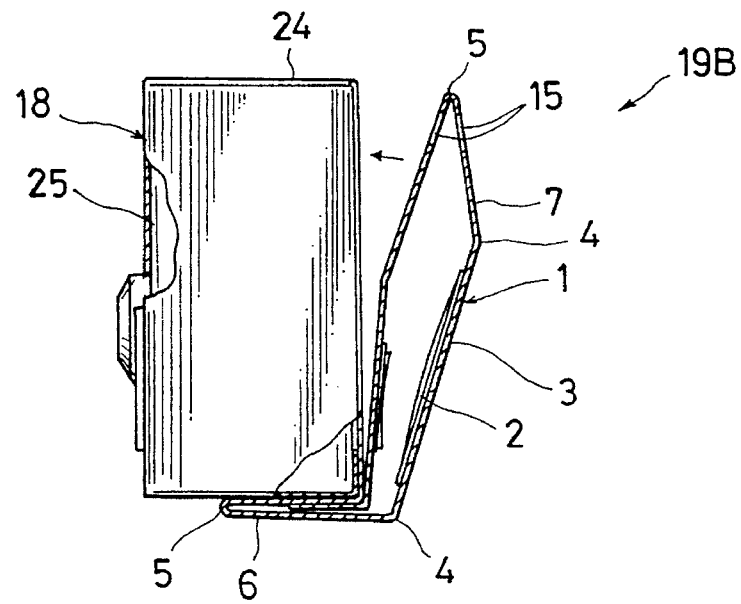
FIG. 22 is a partly cross-sectional side view of the third embodiment shown folded while the disposable camera is used.

Referring to FIGS. 8–13, the binoculars 1 are optionally attached to a bottom wall of a disposable camera 18 with a double-sided-adhesive tape 17 having a peeling tape 16 which itself is bonded to a part of the top panel 6 near the eyepiece lens panel 10. Thus, a binocular equipped camera 19 is integrally composed of the binoculars 1 and the disposable camera 18. The binocular equipped camera 19 is usable as a disposable camera 18 with the binoculars collapsed as shown in FIG. 13 because a view-finder 20 of the disposable camera 18 is viewable through the windows 15, 15 of the binoculars 1. The binoculars 1 are usable in a trapezoidal-box-like form as shown in FIGS. 9 to 11.

Additional embodiments of the invention are shown in FIGS. 14 to 22. In the description of these embodiments, duplicate description of components identical to the previously described components of the invention are omitted and identical reference designations are given to identical components.

In a second embodiment, shown in FIGS. 14 to 18, a significant difference from the first embodiment of this invention includes protrusions for engagement 21, 21 and slits for engagement 22, 22 formed in the side folding portion 13, 13 of side panels 14A, 14A, and the protrusions for engagement 21, 21 engaging with the slits for engagement 22, 22 respectively.

It will be appreciated that it is possible to obtain the same effect of the first embodiment even where binoculars 1A include side panels 14A, 14A arranged as described.

Therefore, a binocular equipped camera 19A is provided by attaching the binoculars 1A to the disposable camera 18 with adhesive member 23 such as adhesive, double-sided-adhesive tape, or the like.

Referring to FIGS. 19 to 22, a third embodiment differs from the first embodiment of the invention in that an outer case 24 of the disposable camera 18, the objective lens panel 3, the top and bottom panels 6, 7, the eyepiece lens panel 10, and the side panels 14, 14 of the binoculars 1 are integrally formed in one piece. In the embodiment having the above-mentioned construction, a binocular equipped camera 19B provided with the binoculars 1 is produced by fitting only a disposable camera body 25 into the outer case 24.

Figure 23:
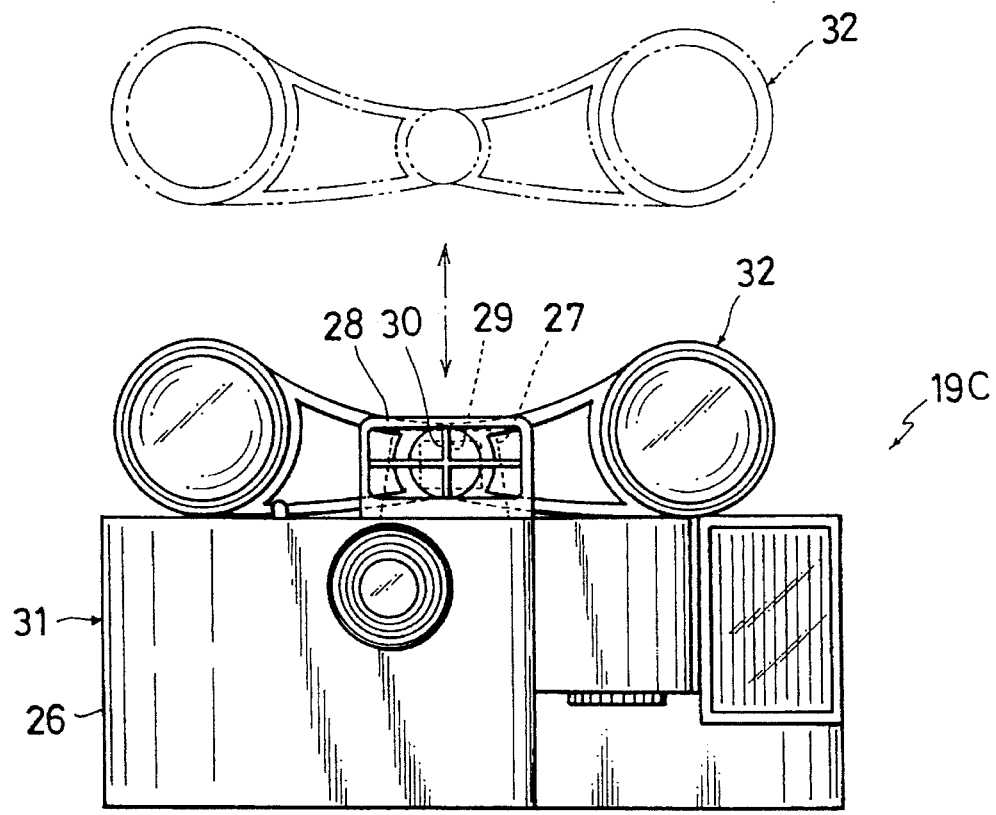
FIG. 23 is an elevational view showing small-sized binoculars mounted to a camera.
Figure 24:
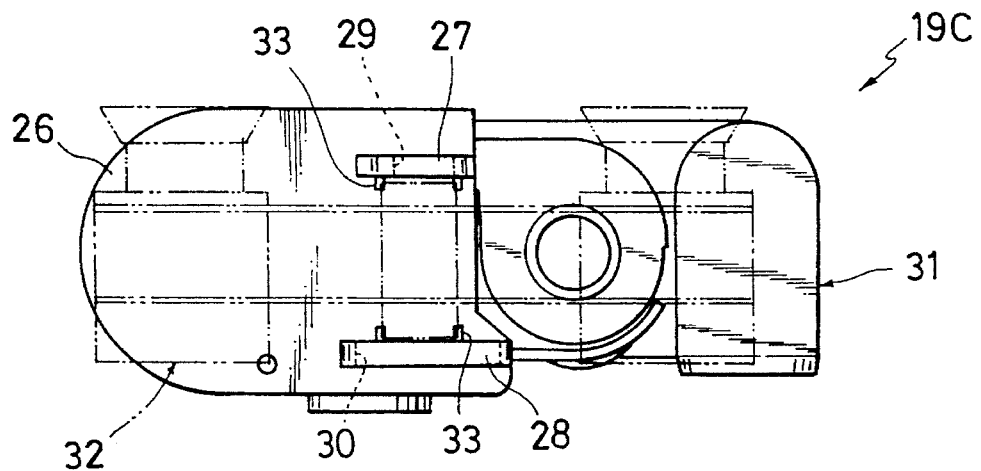
FIG. 24 is a plan view showing the small-sized binoculars mounted to the camera.
Figure 25:
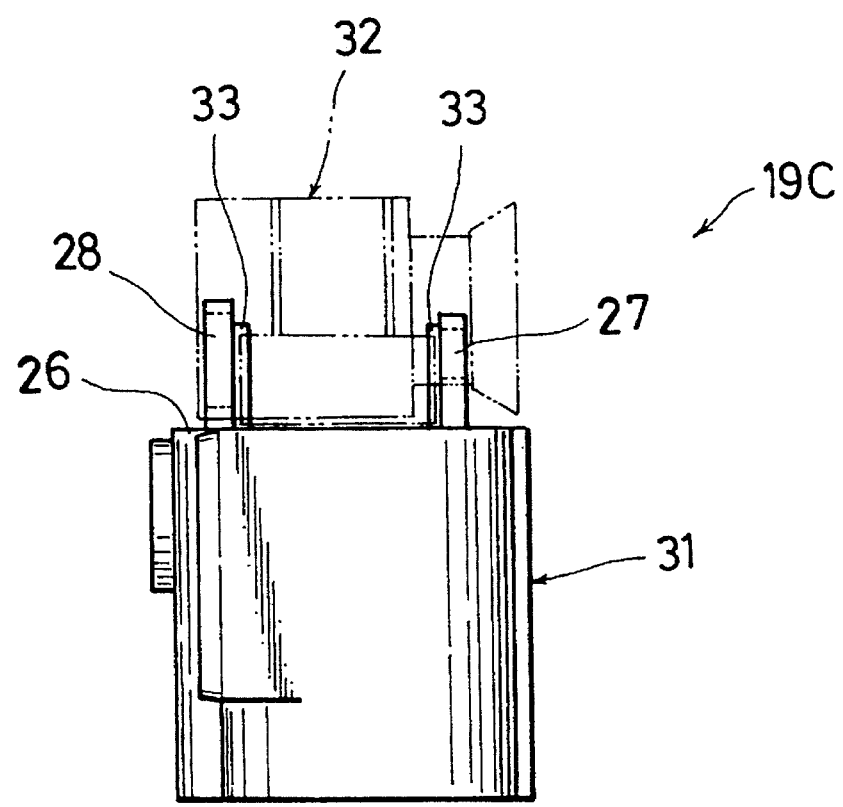
FIG. 25 is a side view showing the small-sized binoculars mounted to the camera.

Referring to FIGS. 23 to 25, another embodiment of a binocular equipped camera 19C has a camera 31 provided with clamp members 27, 28 extending upwardly from a top wall of a body 26 of the camera 31; one of the clamp members 27 has a view-finder 29 and the other of the clamp members 28 has a sighting window 30 provided with cross hairs for aiming when functioning in conjunction with the view-finder 29.

The clamp members 27, 28 have a pair of retaining bosses 33, 33 formed to retain small-sized binoculars 32 detachably between the clamp members 27, 28. The small-sized binoculars 32 and the camera 31 are preferably used separately by detaching the small-sized binoculars 32 from the camera 31. During transport they are attached to each other.

Having described the invention in relation to the embodiment shown in FIGS. 23 to 25, where the small-sized binoculars 32 are attached upside down by the retaining bosses 33, 33, it is intended that the invention is not to be limited to the details of description, unless otherwise specified. For example, the binocular equipped camera 19C is optionally usable in combination form where the retaining bosses 33, 33 are extended further in an upward direction by the clamp members 27, 28.

It is further realized that the adhesive member 23 may optionally be located on portions of the binoculars 1A including front and rear portions of the top and bottom panels 6, 7 to optionally be attached to bottom or rear surfaces of the disposable camera 18 in the embodiment of FIGS. 9–18.

What is claimed is:

1. A binocular equipped camera comprising:

binoculars including an objective lens panel having objective lenses mounted thereon and top, bottom, and right and left side edges, top and bottom panels having front and rear folding portions at opposing front and rear edges;

said top and bottom panels having said front folding portions coupled to said objective lens panel at respective ones of said top and bottom edges of said objective lens panel such that said top and bottom panels are extendable in a depthwise direction;

said binoculars including an eyepiece lens panel joined to said top and bottom panels via said rear folding portions of said top and bottom panels, said eyepiece lens panel having eyepiece lenses mounted thereon in functional alignment with said objective lenses; and said binoculars including right and left side panels having front and rear folding portions joined respectively to said right and left side edges of said objective lens panel and said eyepiece lens panel;

said top and bottom panels each having a fold running lengthwise at a mid-depth position such that said top and bottom panels deflect outwardly, bending at said folds and said front and rear folding portions, when said objective lens panel and said eyepiece lens panel are pressed towards each other;

said right and left side panels each having a fold running widthwise at a mid-depth position such that said right and left side panels deflect inwardly, bending at said folds and said front and rear folding portions, when said objective lens panel and said eyepiece lens panel are pressed towards each other;

an adhesive member fixed to said binoculars by adhesive bonding; and a disposable camera attached to said binoculars by said adhesive member.

2. A binocular equipped camera as claimed in claim 1, wherein said objective lens panel, said top and bottom panels, said eyepiece lens panel and said right and left side panels are made integrally of one of cardboard, cardboard coated with a sheet of synthetic resin material, and cardboard-like synthetic resin material.

3. A camera with binoculars as claimed in claim 1, wherein said objective lenses and said eyepiece lenses are made from plastic.

4. The binocular equipped camera according to claim 1 wherein said adhesive member is attached to said top panel of said binoculars and said disposable camera has a bottom panel to which said binoculars are attached by said adhesive member.

5. A binocular equipped camera comprising:

binoculars including an objective lens panel having objective lenses mounted thereon and top, bottom, and right and left side edges, top and bottom panels having front and rear folding portions at opposing front and rear edges;

said top and bottom panels having said front folding portions coupled to said objective lens panel at respective ones of said top and bottom edges of said objective lens panel such that said top and bottom panels are extendable in a depthwise direction;

said binoculars including an eyepiece lens panel joined to said top and bottom panels via said rear folding portions of said top and bottom panels, said eyepiece lens panel having eyepiece lenses mounted thereon in functional alignment with said objective lenses; and said binoculars including right and left side panels having front and rear folding portions joined respectively to said right and left side edges of said objective lens panel and said eyepiece lens panel;

said top and bottom panels each having a fold running lengthwise at a mid-depth position such that said top and bottom panels deflect outwardly, bending at said folds and said front and rear folding portions, when said objective lens panel and said eyepiece lens panel are pressed towards each other;

said right and left side panels each having a fold running widthwise at a mid-depth position such that said right and left side panels deflect inwardly, bending at said folds and said front and rear folding portions, when said objective lens panel and said eyepiece lens panel are pressed towards each other;

said bottom panel including two view-windows disposed on opposing sides of said fold of said bottom panel to coincide with each other when said bottom panel is folded;

an adhesive member attached to a portion of said top panel of said binoculars proximate said eyepiece lens panel; and a disposable camera having a rear panel with a view finder window and a bottom panel having said binoculars attached thereto using said adhesive member such that said binoculars are foldable at said folds and said folding portions to extend up along said rear panel of said disposable camera to align said view-windows with the view-finder window of said disposable camera.

6. A binocular equipped camera as claimed in claim 5 wherein said binoculars, said objective lens panel, said top and bottom panels, said eyepiece lens panel and said right and left side panels are made integrally of one of cardboard, cardboard coated with a sheet of synthetic resin material, and cardboard-like synthetic resin material.

7. A binocular equipped camera as claimed in claim 5, wherein said objective lenses and said eyepiece lenses are made from plastic.

\* \* \* \* \*